(12) United States Patent
Moore (10) Patent No.: US 9,726,503 B2
(45) Date of Patent: Aug. 8, 2017

(54) USER-WORN DEVICES, SYSTEMS, AND METHODS FOR DIRECTING A USER IN AN EMERGENCY

(71) Applicant: Toyota Motor Engineering & Manufacturing North America, Inc., Erlanger, KY (US)

(72) Inventor: Douglas Moore, Livermore, CA (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/813,508

(22) Filed: Jul. 30, 2015

(65) Prior Publication Data

US 2017/0030720 A1   Feb. 2, 2017

(51) Int. Cl.
*G01C 21/20*   (2006.01)
*H04W 4/04*   (2009.01)
*G08B 7/06*   (2006.01)
*G01C 21/36*   (2006.01)
*G01C 21/34*   (2006.01)

(52) U.S. Cl.
CPC .......... *G01C 21/206* (2013.01); *G08B 7/066* (2013.01); *H04W 4/04* (2013.01); *G01C 21/34* (2013.01); *G01C 21/36* (2013.01)

(58) Field of Classification Search
CPC ...... G01C 21/206; G01C 21/00; G01C 21/36; H04W 4/02; H04W 4/021; H04W 4/04; G08B 21/0269; G08B 21/0492

USPC ........................................ 701/433, 434, 519
See application file for complete search history.

(56) References Cited

U.S. PATENT DOCUMENTS

| 7,221,928 | B2 | 5/2007 | Laird et al. |
| 8,116,724 | B2 | 2/2012 | Peabody |
| 8,280,364 | B1 * | 10/2012 | Sennett ................ H04W 4/001 370/344 |
| 8,666,029 | B2 | 3/2014 | Binning |
| 8,918,075 | B2 | 12/2014 | Maier et al. |
| 2005/0068171 | A1 | 3/2005 | Kelliher et al. |
| 2015/0334530 | A1 * | 11/2015 | Scott ...................... G06Q 50/22 455/456.1 |
| 2016/0047663 | A1 * | 2/2016 | Iyer ...................... G01C 21/206 701/411 |
| 2016/0210834 | A1 * | 7/2016 | Dayal .................... G08B 21/02 |

* cited by examiner

*Primary Examiner* — Isaac Smith
(74) *Attorney, Agent, or Firm* — Dinsmore & Shohl LLP (57) ABSTRACT

User-worn devices, systems containing such user-worn devices, and methods of assisting a user in an emergency are disclosed. A user-worn device includes a processing device and a non-transitory, processor-readable storage medium. The non-transitory, processor-readable storage medium includes one or more programming instructions that, when executed, cause the processing device to receive an input from a building system, determine that the input corresponds to an emergency, determine a response protocol for responding to the emergency, provide directions to a user, and provide tracking information regarding the location of the user inside the building. The input is only received when the user-worn device is located within a building having the building system. The directions guide the user to a location.

18 Claims, 7 Drawing Sheets

USER-WORN DEVICES, SYSTEMS, AND METHODS FOR DIRECTING A USER IN AN EMERGENCY

TECHNICAL FIELD

The present specification generally relates to user-worn emergency response devices and more specifically, to user-worn devices, systems, and methods for directing users in an emergency.

BACKGROUND

User-worn personal alert devices generally provide remote connectivity to a networked base station. In the event of an emergency, the user-worn personal alert device sends a signal to the base station, which directly or indirectly notifies emergency response personnel of the emergency. Some user-worn personal alert devices require the user to press a button or otherwise complete an action to send the signal. However, existing personal alert device cannot be used for providing a user instructions for moving to a desired location during an emergency and tracking the user's location within a building.

Accordingly, a need exists for a personal alert device that provides two-way communication functionality between a user and a building system or emergency response personnel, provides directions for guiding the user to a desired location, and provides location data to the emergency response personnel so that the user can be located within the building.

SUMMARY

In one embodiment, a user-worn device includes a processing device and a non-transitory, processor-readable storage medium. The non-transitory, processor-readable storage medium includes one or more programming instructions that, when executed, cause the processing device to receive an input from a building system, determine that the input corresponds to an emergency, determine a response protocol for responding to the emergency, provide directions to a user, and provide tracking information regarding the location of the user inside the building. The input is only received when the user-worn device is located within a building having the building system. The directions guide the user to a location.

In another embodiment, a method of assisting a user in an emergency with a user-worn device having a processing device includes receiving, by the processing device, an input from a building system, determining, by the processing device, that the input corresponds to an emergency, determining, by the processing device, a response protocol for responding to the emergency, providing, by the processing device, directions to a user, and providing, by the processing device, tracking information regarding the location of the user inside the building. The input is only received when the user-worn device is located within a building comprising the building system. The directions guide the user to a location.

In yet another embodiment, an emergency service system includes a building system within a building, and a user-worn device carried by a user located within the building. The building system monitors the building and detects emergencies, and the user-worn device interfaces with the building system to receive an input corresponding to an emergency, provide the user with instructions for moving inside of the building during the emergency, and track a location of the user inside the building.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

The embodiments described herein are generally directed to user-worn devices for directing a user in an emergency. When a building system associated with a building detects an emergency, it sends a signal to the user-worn device. In turn, the user-worn device notifies the user, directs the user to a desired location (such as a secure location within the building or an exit of the building) using turn-by-turn directions, allows the user to communicate with emergency response personnel, and also provides location data corresponding to the user's location inside the building so that the emergency response personnel can easily locate the user. As used herein, the term "user-worn device" means a device capable of being physically worn on the body or clothing of a person, as well as a hand-held device capable of being carried by a person in his or her hands.

The systems and methods described herein may be used by persons having a disability. For example, the systems and methods described herein may be used to guide a visually impaired or hearing impaired user by providing instructions in a manner that is generally not provided by current emergency service systems.

Figure 1:
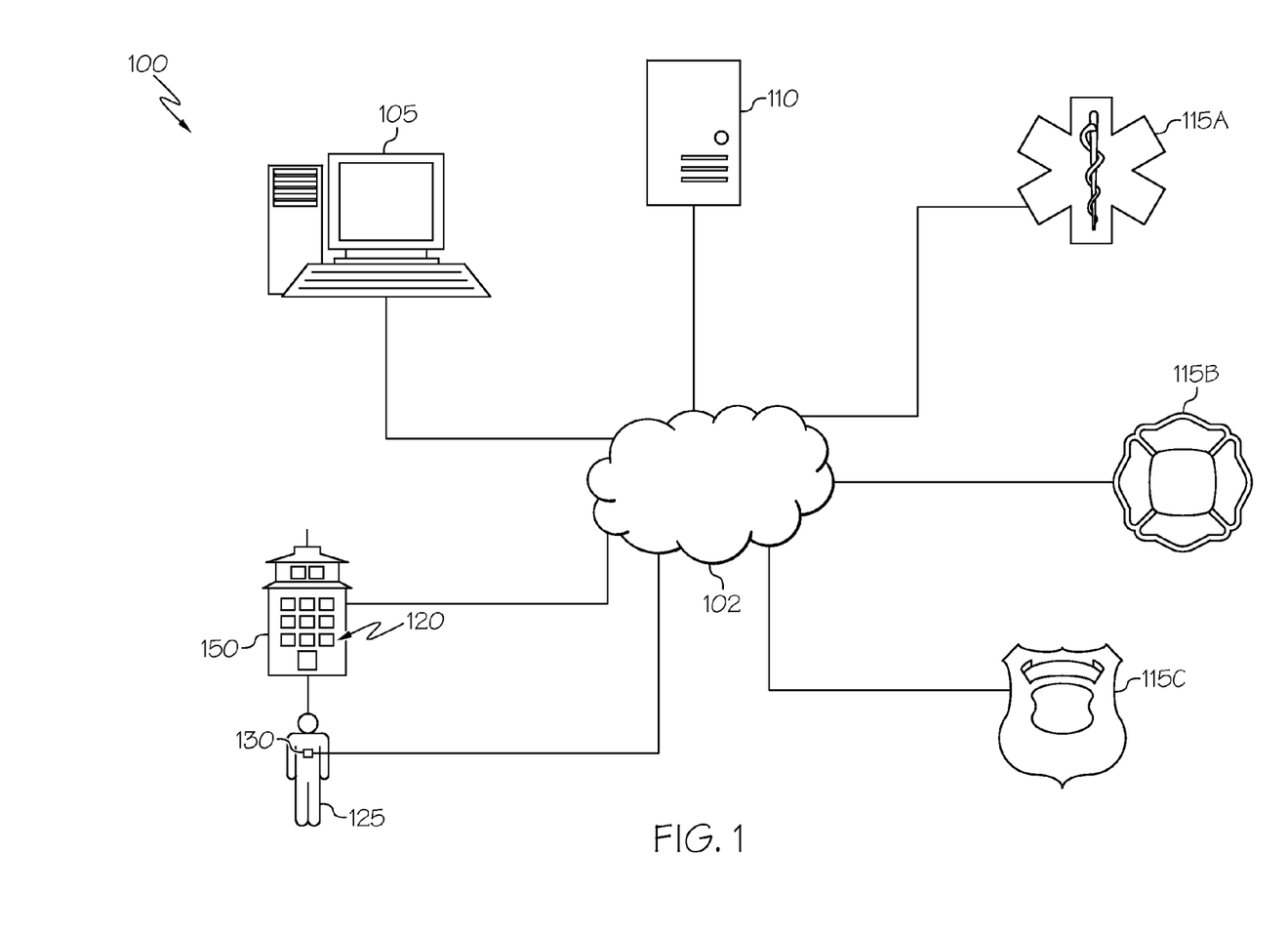
FIG. 1 depicts a schematic diagram an illustrative operating environment according to one or more embodiments shown and described herein.

FIG. 1 depicts an illustrative operating environment 100 according to an embodiment. As shown in FIG. 1, the operating environment 100 may include one or more computing devices 105, one or more servers 110, one or more building systems 120 (and user-worn devices 130 located therein), and one or more emergency response systems 115A, 115B, 115C (collectively 115) communicating via a communications network 102.

Each of the one or more computing devices 105 may generally be any computing device having a processing device (e.g., a generally purpose processor, an application-specific processor, and the like) and a processor-readable storage medium. In embodiments where more than one computing device 105 exists, each computing device may operate independently of the other computing devices 105. In other embodiments, the computing devices 105 may operate in an array-type configurations where the computing devices 105 collectively act as a single unit. Each of the one or more computing devices 105 may be owned and/or maintained by a single entity or may be owned and/or maintained by different entities. The function of the one or more computing devices 105 is not limited by this disclosure. Thus, the one or more computing devices 105 may be used for any purpose. An illustrative purpose may include, but is not limited to, facilitating and maintaining communication between the one or more building systems 120, the one or more servers 110, and the one or more emergency response systems 115.

Each of the one or more servers 110 may generally be any computing device having a processing device and a storage medium. Each of the one or more servers 110 may contain or be coupled to one or more knowledge bases, databases, data volumes, datasets, metabases, logs, flat files, tables, and/or the like. The one or more servers 110 may provide information to the one or more building systems 120, the one or more user-worn devices 130, the one or more emergency response systems 115, or the like. For example, an emergency response system 115 may access information about a user 125 of a particular user-worn device 130 to determine an appropriate method of responding to the user 125 (e.g., accessing information regarding a user's disabilities or the like).

Each of the one or more emergency response systems 115 may be computing systems or communications systems to facilitate communication between emergency responders using the one or more emergency response systems 115 and the communications network 102. Illustrative emergency response systems 115 may include, but are not limited to, emergency medical service (EMS) systems 115A, fire department systems 115B, and police and personal security systems 115C.

Each of the one or more building systems 120 may generally be any system or component thereof (e.g., a device) located in a building 150. The one or more building systems 120 may monitor for potential emergency situations and communicate with the various other components via the communications network 102. Illustrative building systems 120 may include, but are not limited to, fire alarm systems, carbon monoxide systems, building security systems, building HVAC systems, building medical alert systems, and the like. Illustrative components of the building systems 120 may include, but are not limited to, smoke detectors, heat detectors, sprinkler systems, carbon monoxide detectors, surveillance monitors, motion detectors, door/window detectors, security cameras, and the like. In some embodiments, the one or more user-worn devices 130 may also be a portion of the building system 120, as described in greater detail herein. The one or more building systems 120, when coupled with the one or more user-worn devices 130 inside a building 150, may be referred to herein as an emergency service system.

The one or more user-worn devices 130 may generally serve as a primary interface with a user, and may further contain one or more applications that are configured to communicate with the one or more computing devices 105, the one or more servers 110, the one or more emergency response systems 115, and/or the one or more building systems 120, as described in greater detail herein. In some embodiments, the one or more user-worn devices 130 may contain programming instructions for sensing, communicating, detecting a location, and/or the like. In some embodiments, the programming instructions may be embodied within an application that may be received by the one or more user-worn devices 130 from a provider, an app store, the one or more computing devices 105, the one or more servers 110, and/or the like.

The communications network 102 may communicatively couple the illustrated components and/or components not specifically described and illustrated herein. The communications network 102 is not limited by this disclosure, and may include any communications network now known or later developed. The communications network 102 may utilize any suitable data communication, telecommunication, wired, wireless, or other technology for facilitating communications. The communications network 102 may be used to connect any number of devices, systems, or components, including those not specifically described herein. Although FIG. 1 depicts a single communications network 102, the communications network may use any number of communications links. For example, the communications network 102 may use one or more of a local area network (LAN), a wide area network (WAN), a wireless local area network (WLAN), a metropolitan area network (MAN), a personal area network (PAN), a virtual private network (VPN), the internet, a cellular network, a paging network, a private branch exchange (PBX), and/or the like. Data sent via the communications network 102 may be encrypted or unencrypted. The various systems and devices may be coupled to the communications network 102 via the communications link.

Figure 2:
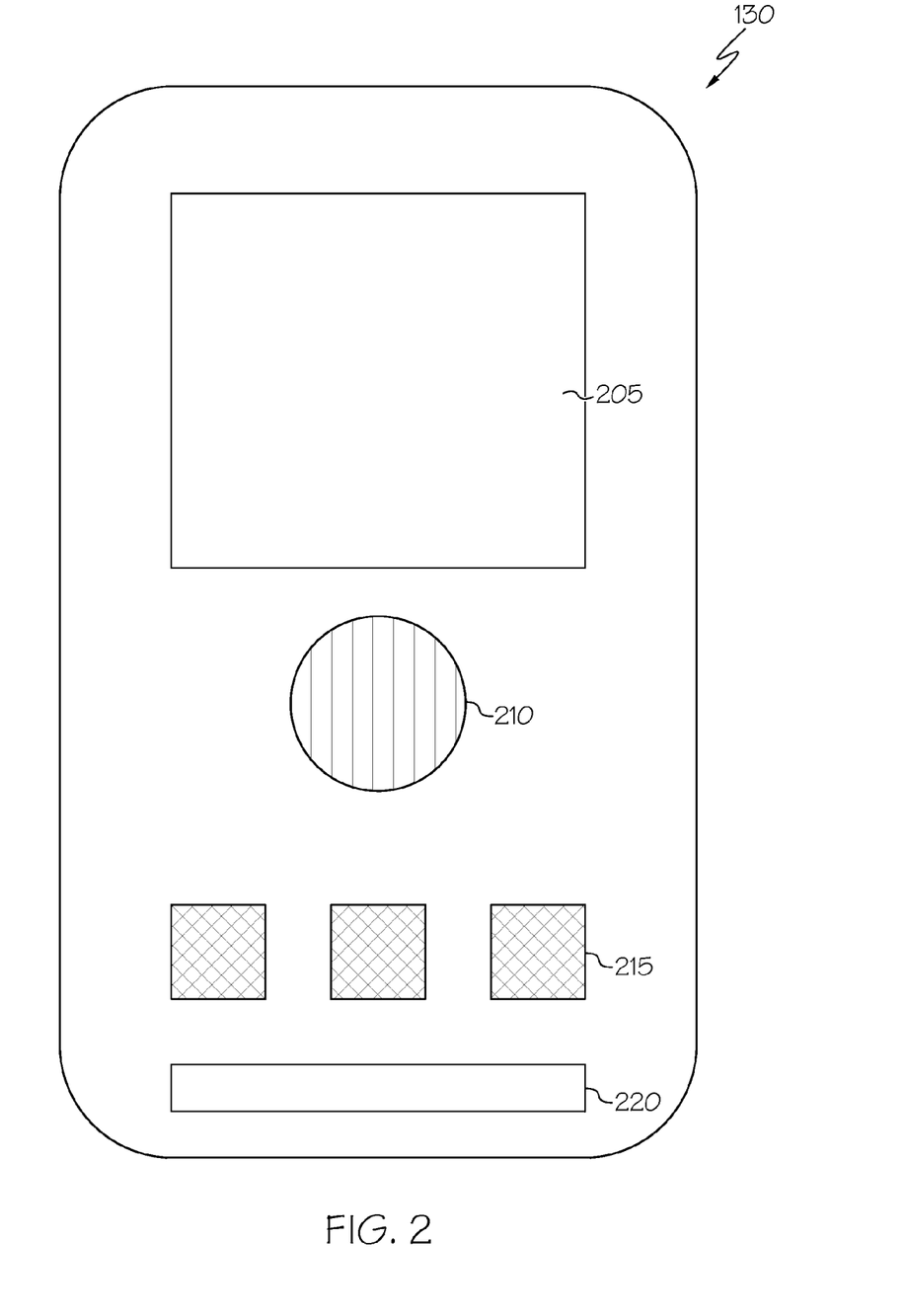
FIG. 2 depicts a schematic diagram of an illustrative user-worn device according to one or more embodiments shown and described herein.

FIG. 2 depicts a block diagram of a non-limiting illustrative user-worn device 130. The user-worn device 130 may be generally portable in nature such that it can be carried with a user with relative ease, particularly while the user is located within a building 150 having the building system 120 (FIG. 1). In addition, the user worn device 130 may not function if it is carried away from the building system 120 (FIG. 1). Thus, the user-worn device 130 may only function while in the building 150 as a component of the building system 120 (FIG. 1). In some embodiments, the user-worn device 130 may be worn by the user in a way similar to that of a necklace, a bracelet, a ring, a pair of glasses, headgear, or the like. However, the present disclosure is not limited to devices that are only worn. That is, a user can carry the user-worn device 130 in hand, in a pocket, or the like without departing from the scope of the present disclosure. The user-worn device 130 may be a dedicated device or may be a multifunction device that performs functions other than those described herein. For example, the user-worn device 130 may be a device such as a smartphone or tablet that contains software programming that performs the functions described herein.

As shown in FIG. 2, the user-worn device 130 may include various components that provide functionality such that the user-worn device 130 can function as described herein. Illustrative components may include, but are not limited to, a display 205, a sound component 210, one or more input components 215, and a sensor component 220. The various components may generally provide the user-worn device 130 with functionality to interact with a user, provide communications capabilities to the user, communicate with the building system 120 (FIG. 1), and sense various environmental conditions. However, it should be understood that the user-worn device 130 may include other components that provide additional functionality without departing from the scope of the present disclosure.

In various embodiments, the display 205 may generally display information to a user of the user-worn device 130. For example, the display 205 may display information such as status indicators, graphical depictions, photos, videos, or the like. More particularly, the display 205 may provide turn-by-turn directions to a user, displaying recorded videos, or displaying live video feeds during a communication session. In such embodiments, the display 205 may be integrated with or function in conjunction with a communications interface, as described in greater detail herein. As such, in embodiments where the user of the user-worn device 130 is hearing impaired, the display 205 may provide information that would otherwise be aurally communicated to the user, such as by providing closed caption-type functionality and/or visual alerts from the building system 120 (FIG. 1) that the user would not be able to hear (such as a fire alarm, a tornado siren, or the like).

In various embodiments, the sound component 210 may be, for example, a speaker, a microphone, and/or the like. That is, in some embodiments, the sound component 210 may generate sound received from external signals or sources, such as audio signals, voice commands/communication, and/or the like. In some embodiments, the sound component 210 may receive sound commands spoken by a person (e.g., the user), such as voice commands/communication or the like. Thus, a user may use the user-worn device 130 for two way communication such as a telephone or radio. In such embodiments, the sound component 210 may be integrated with or function in conjunction with communications interface, as described in greater detail herein. As such, in embodiments where the user of the user-worn device 130 is visually impaired, the sound component 210 may provide information that would otherwise be visually communicated to the user, such as providing auditory alerts regarding lighted signs, providing auditory turn-by-turn navigation, and/or the like. It should be understood that, in some embodiments, the display 205 and the sound component 210 may be used separately or in conjunction with each other, such as for an audio/video chat session or the like.

The one or more input components 215 may generally provide the user with functionality for inputting information into the user-worn device 130. For example, the user may input a response to a query, activate/deactivate features, turn the user-worn device 130 on or off, and/or the like with the one or more input components 215. Each of the one or more input components 215 may be any type of input device, such as, for example, a button, a track pad, a switch, a key, and the like. While the one or more input components 215 are shown as separate components in FIG. 2, it should be understood that in some embodiments, the one or more input components 215 may be integrated with one or more other components of the user-worn device 130, such as, for example, the display 205. Thus, the one or more input components 215 and the display 205 may be integrated into a single touch screen device or the like.

The sensor component 220 is not limited by this disclosure, and may include any number or combination of sensors. Illustrative sensors may include an environmental sensor such as a smoke sensor, a carbon monoxide sensor, a heat sensor, a water sensor, and/or the like, a biometric sensor such as a heart rate sensor or the like, a motion sensor, a location-based sensor such as GPS, and/or the like. The sensor component 220 may generally obtain information from the environment surrounding the user-worn device 130, such as, for example, presence of smoke, carbon monoxide, user location, user vitals, and/or the like. However, it should be understood that the sensor component 220 may also contain other sensors or obtain certain other information without departing from the scope of the present disclosure. It should also be understood that, in some embodiments, the user-worn device 130 does not include a sensor component.

It should be understood that the components listed herein for the user-worn device 130 is not exhaustive. Thus, the user-worn device 130 may include other components not specifically described herein.

Figure 3:
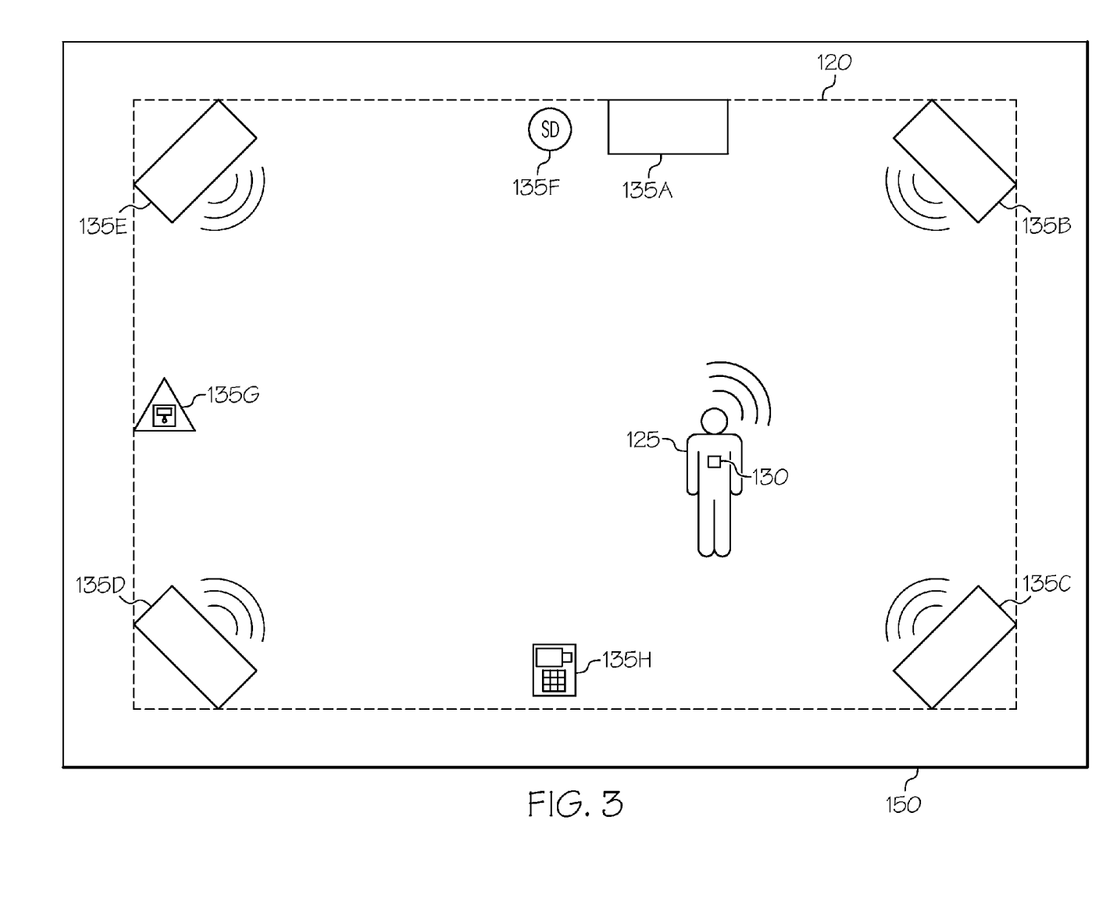
FIG. 3 depicts a schematic diagram of an illustrative emergency service system within a building according to one or more embodiments shown and described herein.

FIG. 3 depicts a schematic diagram of an emergency service system including a building system 120 and a user-worn device 130 worn by a user 125 while in a building 150. The building 150 is not limited by this disclosure, and can generally be any building or complex. In particular embodiments, the building 150 may be an office building/complex, a manufacturing facility, an industrial facility, or the like. In embodiments where the building 150 is a complex, the term "building" may refer to a plurality of buildings located in the same vicinity, such as an office park, an industrial park, a grouping of manufacturing facilities, or the like.

The building 150 may include one or more components 135A-H arranged together as a building system 120. The number of components 135A-H in the building system 120 is not limited by this disclosure, and thus may include any number of components. In addition, the building system 120 can include any components now known or later developed. As previously described herein, illustrative components may include, but are not limited to, a control system 135A, motion and/or location sensors 135B-E, smoke and/or carbon monoxide detectors 135F, alarm systems 135G, audio/video monitoring devices 135H, and the like. The components 135A-H may be generally interconnected such that each of the components 135A-H can communicate with the others. In addition, any of the components 135A-H may communicate with the user-worn device 130, as described in greater detail herein. In some embodiments, the control system 135A may act as a central command device that provides commands to the other components 135B-H, receives inputs from the other components 135B-H, communicates with the user-worn device 130, and communicates with other components of the operating environment 100 (FIG. 1) on behalf of the building system 120.

Figure 4:
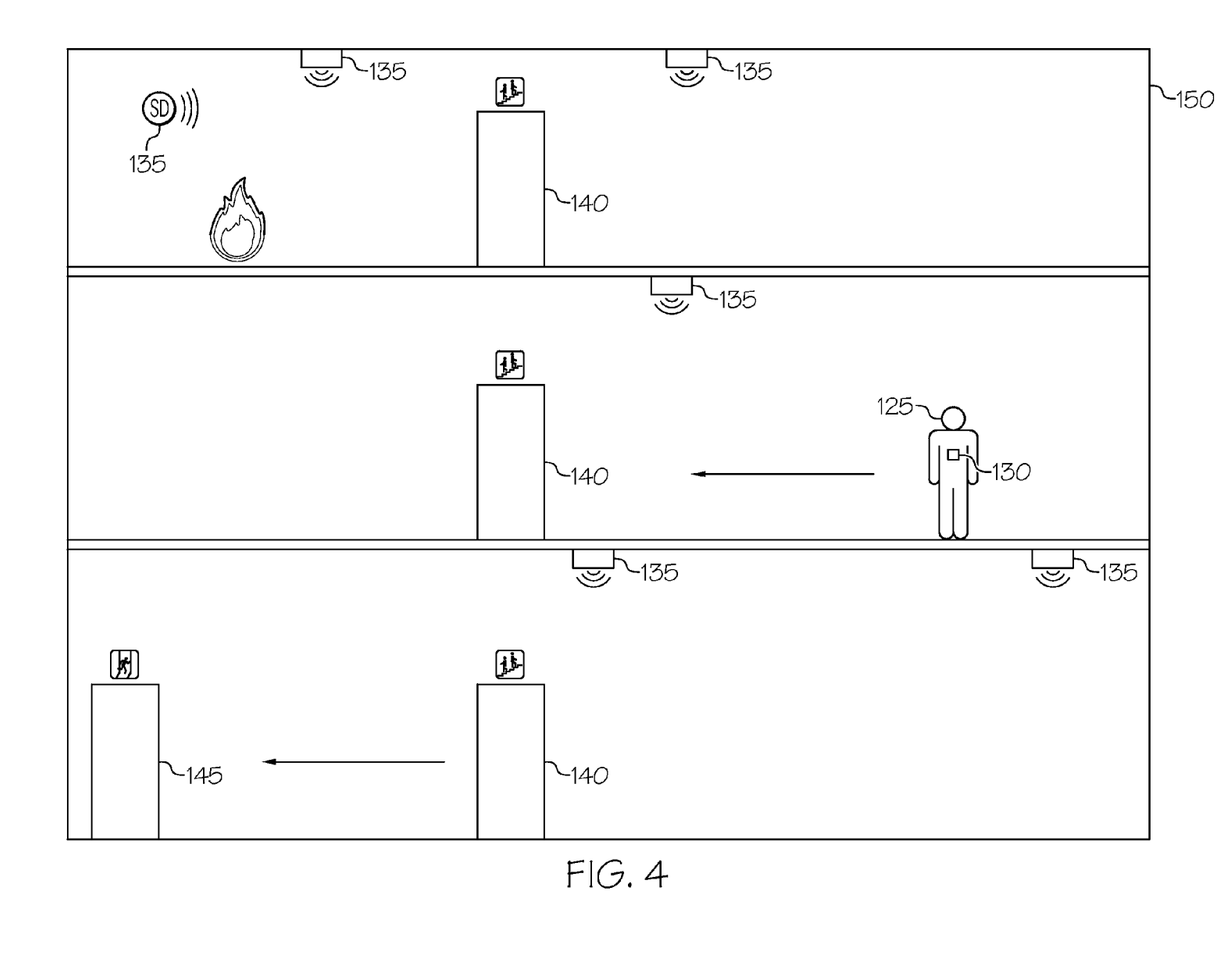
FIG. 4 depicts a schematic diagram of an illustrative emergency service system within a building during an emergency according to one or more embodiments shown and described herein.

FIG. 4 depicts the emergency service system within the building 150 during an emergency. For example, as shown in FIG. 4, the emergency may be a fire in the building 150. However, it should be understood that the emergency is not limited by this disclosure, and includes any type of emergency, such as, for example, weather-related emergencies (earthquakes, hurricanes, tornadoes, blizzards, tsunamis, and the like), crime-related emergencies (burglaries, terrorist threats, and the like), property damage-related emergencies (fires, chemical spills, and the like), and medical emergencies.

In various embodiments, a component 135 of the building system 120 (FIG. 3) may detect the emergency. For example, a smoke detector, a heat detector, and/or a carbon monoxide detector may detect the presence of a fire. When the emergency is detected, the building system 120 (FIG. 3) may send a signal to the user-worn device 130 to notify the user of the emergency. Accordingly, the user-worn device 130 may alert the user 125, such as via an alarm, an audio signal, a video signal, a haptic signal (e.g., vibratory), or the like. In some embodiments, the user-worn device 130 may notify the user 125 of the nature of the emergency.

The user-worn device 130 may also guide the user to a location, which may depend on the emergency. For example, if the emergency is a natural disaster such as a tornado, the user-worn device 130 may direct the user 125 to a lower level or interior region inside the building 150. If the emergency is a fire or the like, the user-worn device 130 may direct the user 125 to an exit of the building so that the user may be guided to a location outside the building 150. In some embodiments, the user-worn device 130 may communicate with the building system 120 (FIG. 3) to appropriately guide the user 125. For example, the user-worn device 130 may receive instructions from the building system 120 (FIG. 3) regarding a location to direct the user, which may be based on the type of emergency, certain obstructions that exist (e.g., fallen debris, smoke, or the like), the fastest or most efficient means of reaching desired location, and/or the like. The user-worn device 130 may also receive instructions from the building system 120 (FIG. 3) to direct the user through doorways 145, down stairwells 140, and/or the like. In other embodiments, the user-worn device 130 may determine how to appropriately guide the user 125 without communicating with the building system 120 (FIG. 3).

Location data regarding a location of the user 125 within the building 150 may be transmitted by the user-worn device 130 to the building system 120 (FIG. 3) such that updated instructions can be provided. In some embodiments, the user 125 may also be tracked via components 135 of the building system 120 (FIG. 3), such as motion detectors, video cameras, and/or the like. Tracking data from the user-worn device 130 and/or the various components 135 may also be provided to emergency service personnel responding to the scene so that the user 125 can be located more quickly and easily than would be possible without the user-worn device 130 and/or the building system 120 (FIG. 3).

Figure 5:
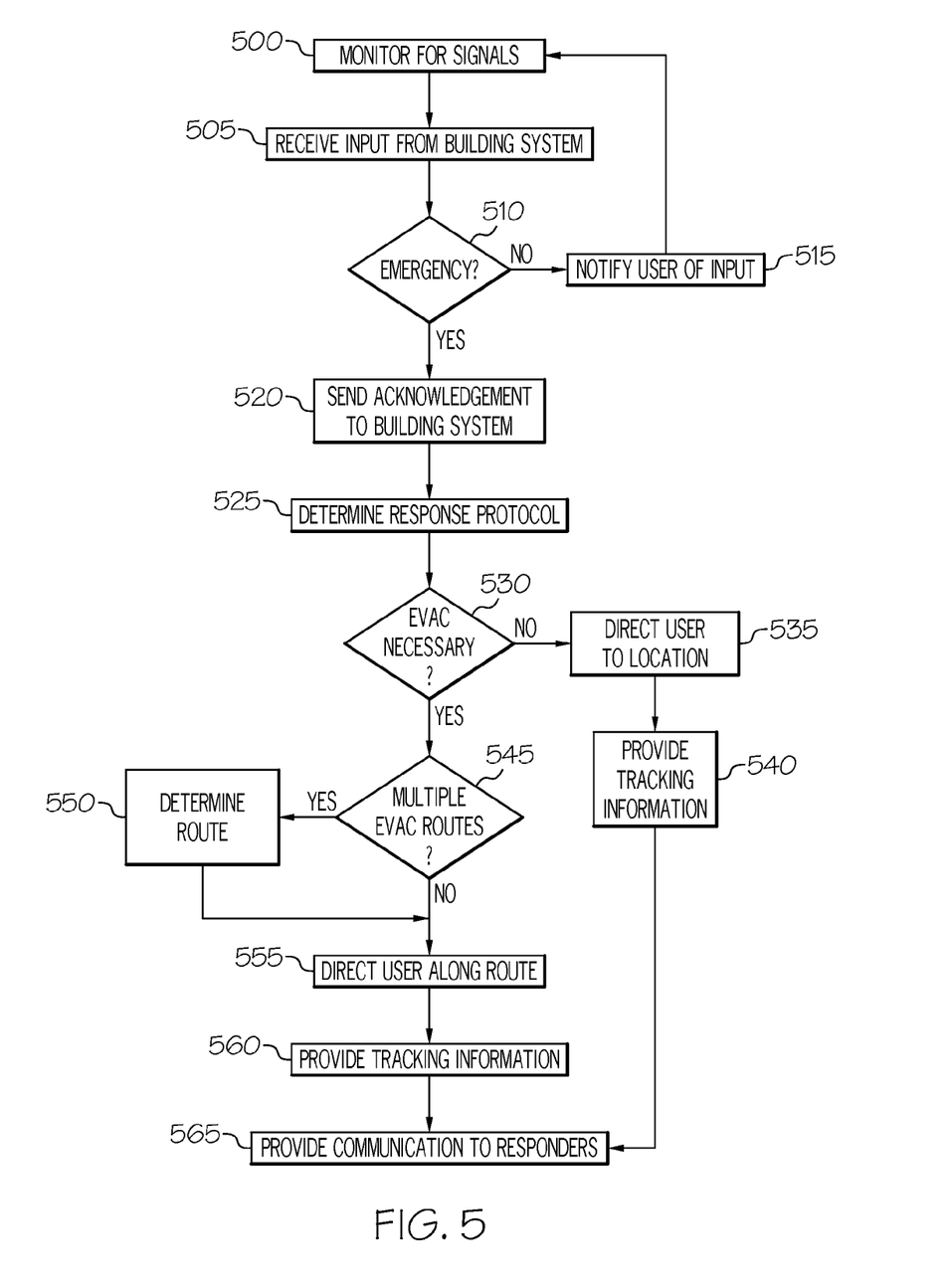
FIG. 5 depicts a flow diagram of an illustrative method of alerting and directing a user during an emergency situation according to one or more embodiments shown and described herein.

FIG. 5 depicts a flow diagram of an illustrative method of directing a user and providing tracking and communication functions for the user in the event of an emergency. The method described with respect to FIG. 5 may generally be completed by the user-worn device 130 (FIG. 2) and/or a component thereof. However, it should be understood that certain functions described herein may also be completed by, or in conjunction with, the building system 120 (FIG. 3) and/or a component thereof. For purposes of simplicity, the various steps described with respect to FIG. 5 will refer to the user-worn device 130 (FIG. 2). In some embodiments, the steps described with respect to FIG. 5 may be completed by a processing device when instructed by program code installed on a non-transitory, processor-readable storage medium, as described in greater detail herein.

In various embodiments, the user-worn device 130, when located within the building, may continuously monitor for signals, as depicted in step 500. The continuous monitoring may ensure, for example, that the user-worn device 130 remains in contact with the building system 120 and is instantly able to receive inputs from the building system 120 when they are sent. Such a continuous monitoring may also allow the user-worn device 130 to determine if contact with the building system 120 is lost and take actions to reestablish contact, such as by notifying the user or the like.

In step 505, the user-worn device 130 may receive an input from the building system 120. The input is not limited by this disclosure, and may generally be any communication between the building system 120 and the user-worn device 130. In some embodiments, the input may be a test signal to verify a communications link between the building system 120 and the user-worn device 130. In some embodiments, the input may be an emergency signal. Because the input may vary, in step 510, the user-worn device 130 may determine whether the input was an emergency signal. For example, the emergency signal may be coded in such a manner that the user-worn device 130 may detect the signal as an emergency signal. If the input is not an emergency signal, the user-worn device 130 may optionally notify the user of the signal in step 515. The user-worn device 130 may return to step 500 to continue monitoring for signals.

If the input from the building system 120 is an emergency signal, the user-worn device 130 may optionally send an acknowledgement of the emergency input 520. The acknowledgement may generally be sent to verify communications between the user-worn device 130 and the building system 120 and/or to verify that the user-worn device 130 is functioning appropriately.

In step 525, the user-worn device 130 may determine the response protocol. In some embodiments, determining the response protocol may include receiving response instructions from the building system 120, emergency responders, and/or the like. In other embodiments, determining the response protocol may include receiving information from the building system 120, various components thereof, and/or emergency responders, and formulating an appropriate response protocol based on the received information. The response protocol may vary based on the user's location, the location of various obstructions (e.g., debris, smoke, or the like), the nature of the emergency, the location of the emergency, an amount of time before emergency responders arrive on the scene, a user's disabilities, and/or the like. As the emergency may change, the step 525 of determining the response protocol may be dynamic. That is, the user-worn device 130 may continuously evaluate and determine the response protocol based on changing emergency conditions. It is noted that, in some embodiments, the building system 120 or an emergency response system 115 may determine the response protocol and transmit the response protocol to the user-worn device 130.

In step 530, the user-worn device 130 (or other system) may determine whether an evacuation from the building is necessary or possible. Such a determination may be based on, but is not limited to, the user's location, the location of various obstructions (e.g., debris, smoke, or the like), the nature of the emergency, the location of the emergency, an amount of time before emergency responders arrive on the scene, a user's disabilities, and/or the like. For example, in certain natural disaster emergencies (e.g., a tornado or an earthquake), it may be necessary for the user to remain in the building. In other emergencies, such as a building fire, it may be necessary for the user to evacuate the building if a clear evacuation route exists. However, if the nature of the fire prevents user evacuation from the building, the user-worn device 130 may determine an ideal location for the user to move to until the user can be reached by responders or other personnel.

Accordingly, if an evacuation is not necessary or possible, the user-worn device 130 may direct the user to an ideal location within the building in step 535. Directing the user may include determining the user's location in the building, determining an appropriate route for the user to take to reach the ideal location, and providing directions to the user. The directions may be turn-by-turn navigational-type directions that automatically adjust the route if the user makes a wrong turn, encounters an unknown obstruction, or the like. For example, if the user is visually impaired, the directions and/or other messages may be haptic signals, such as vibrations (e.g., two vibratory pulses may mean turn left, while one vibratory pulse may mean turn right). In addition, the user-worn device 130 may continuously obtain and provide tracking information to the building system 120 and/or emergency responders, as shown in step 540, as well as provide communication capabilities between the user and the emergency responders, as shown in step 565.

If an evacuation is necessary and possible, the user-worn device 130 may determine whether a plurality of evacuation routes exist in step 545. Such a determination may be based on, but is not limited to, the user's location, the location of various obstructions (e.g., debris, smoke, or the like), the nature of the emergency, the location of the emergency, an amount of time before emergency responders arrive on the scene, a user's disabilities, and/or the like. Determining may include receiving inputs and/or commands from the building system 120, where the inputs and/or commands provide evacuation route(s). If a plurality of evacuation routes does exist, the user-worn device 130 may determine a selected evacuation route (i.e., the most appropriate route) in step 550. The selected evacuation route may be based on, for example, the user's location, whether obstructions exist along certain routes, the nature of the emergency, the location of the emergency, the amount of time before emergency responders arrive on the scene, the amount of time for the user to traverse the route, the user's disabilities, and/or the like. For example, if the user is visually impaired, the selected evacuation route may be chosen such that the user avoids certain obstacles that may be difficult for a visually impaired person to traverse.

In step 555, the user-worn device 130 may direct the user along the selected evacuation route. Directing the user may include determining the user's location in the building, determining an appropriate route for the user to take to reach the desired location, and providing directions to the user. The directions may be turn-by-turn navigational-type directions that automatically adjust the route if the user makes a wrong turn, encounters an unknown obstruction, or the like. In addition, the user-worn device 130 may continuously obtain and provide tracking information to the building system 120 and/or emergency responders, as shown in step 560, as well as provide communication capabilities between the user and the emergency responders, as shown in step 565. The user-worn device 130 may generally provide communication capabilities via a communications interface, as described in greater detail herein.

In various embodiments, directing the user, whether to a location in the building or along an evacuation route leading out of the building, may be completed in such a manner so as to account for the user's disabilities. For example, if a user is visually impaired, the user-worn device 130 may direct the user via audio cues and/or haptic cues. If a user is hearing impaired, the user-worn device 130 may direct the user via visual cues and/or haptic cues. If a user is wheelchair-bound, the user-worn device 130 may direct the user along a route that can be traversed via wheelchair (e.g., the route does not contain stairs).

Figure 6:
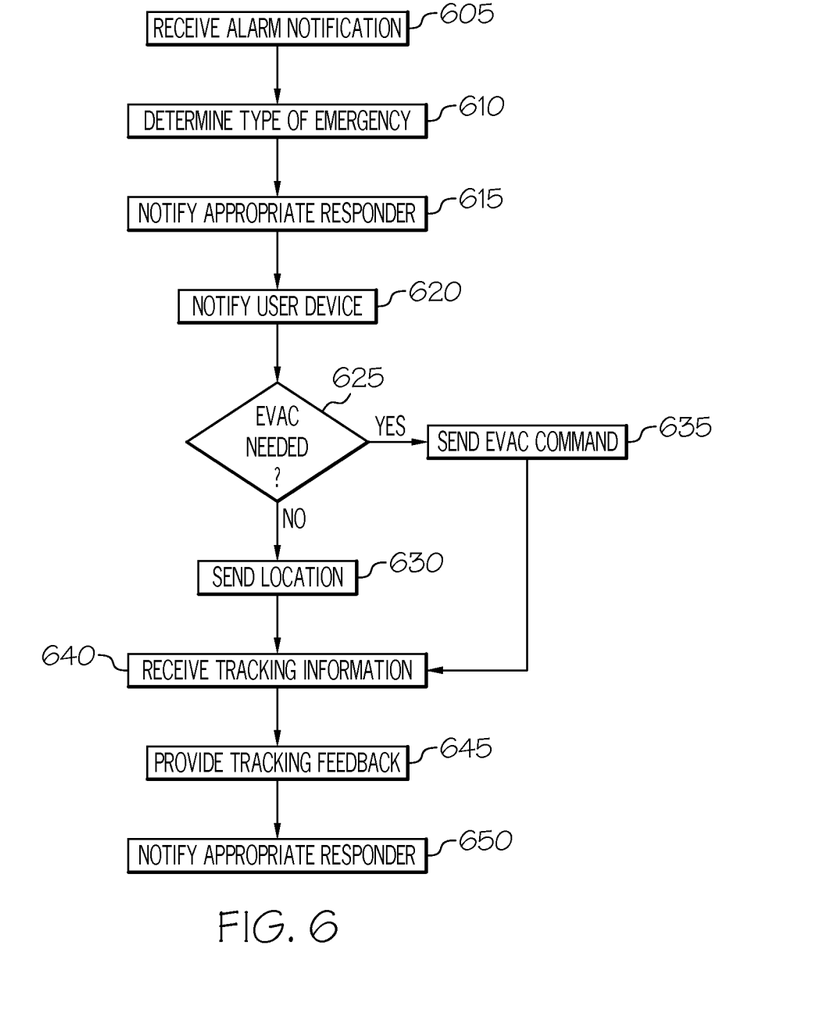
FIG. 6 depicts a flow diagram of an illustrative method of detecting an emergency and communicating with a user-worn device according to one or more embodiments shown and described herein.

FIG. 6 depicts a flow diagram of an illustrative method of detecting an emergency and communicating with a user-worn device 130. The method described with respect to FIG. 6 may generally be completed by the building system 120 (FIG. 3) and/or a component thereof. However, it should be understood that certain functions described with respect to FIG. 6 may also be completed by, or in conjunction with, the user-worn device 130 (FIG. 2) and/or a component thereof without departing from the scope of the present disclosure. For purposes of simplicity, the various steps described with respect to FIG. 6 will refer to the building system 120 (FIG. 2). In some embodiments, the steps described with respect to FIG. 6 may be completed by a processing device when instructed by program code installed on a non-transitory, processor-readable storage medium, as described in greater detail herein.

As shown in step 605, the building system 120 may receive an alarm notification. The notification may be received from any one of the components of the building system 120, the user-worn device 130 and/or a component thereof, an external device (such as an emergency communications alert from an external broadcast device), and/or the like. The alarm notification may provide the building system 120 with various details of the alarm, such as, for example, whether an emergency exists, the type of emergency, the nature of the emergency, whether emergency response personnel have already been dispatched, and/or the like. In some embodiments, the alarm notification may also provide instructions for directing users within the building. The alarm notification may be a data transmission and/or a signal from a dedicated device.

The building system 120 may determine the type of emergency from the received alarm notification in step 610. Determining the type of emergency may generally include analyzing the emergency and extracting an emergency type from the alarm notification. For example, if the alarm notification is a data transmission, the building system 120 may parse the data to determine the type of emergency. If the alarm notification is a signal from a dedicated device, the building system 120 may determine which device sent the signal to determine the type of emergency.

If an emergency responder has not already been notified, the building system 120 may notify an emergency responder in step 615. Notifying the emergency responder may include transmitting a signal and/or a data communication to the emergency responder. In some embodiments, the data communication may provide certain information regarding the emergency. Notifying the emergency responder may be based on the type of emergency, the nature of the emergency, the emergency responder, and/or the like. For example, if the emergency is a fire, the notification may be sent to a fire department. Similarly, if the emergency is a crime related emergency, the notification may be sent to a police department and/or a private security firm.

In addition to notifying an emergency responder, the building system 120 may also alert the user-worn device 130 in step 620. Step 620 may generally only be completed if the user-worn device 130 does not already have information regarding the emergency. That is, if the user-worn device 130 has previously detected the emergency and alerted the building system 120 as previously described herein (such as in step 605), then step 620 may generally be omitted. Alerting the user-worn device 130 may include transmitting a data signal and/or a data communication to the user-worn device 130. In some embodiments, the data communication may provide certain information regarding the emergency. Alerting the user-worn device 130 may also be based on the type of emergency, the nature of the emergency, the emergency responder, and/or the like. For example, if the emergency is a large fire that is an immediate threat to the user, the alert may contain an urgent message notifying the user-worn device 130 to direct the user as quickly as possible. In contrast, if the emergency is a small fire that is not an immediate threat to the user (such as a small paper fire in an isolated room not in the immediate vicinity of the user), the alert may contain a message that a fire has been detected and the user should be aware in case it were to escalate to a large fire.

In optional step 625, the building system 120 may determine whether an evacuation is necessary or possible. Such a determination may be based on, but is not limited to, the user's location, the location of various obstructions (e.g., debris, smoke, or the like), the nature of the emergency, the location of the emergency, an amount of time before emergency responders arrive on the scene, a user's disabilities, and/or the like. For example, in certain natural disaster emergencies (e.g., a tornado), it may be necessary for the user to remain in the building. In other emergencies, such as a building fire, it may be necessary for the user to evacuate the building if a clear evacuation route exists. However, if the nature of the fire prevents user evacuation from the building, the building system 120 may determine a location for the user to move to until the user can be reached by responders.

If an evacuation is necessary and possible, the building system 120 may send an evacuation command to the user-worn device 130 in step 635. In some embodiments, the evacuation command may contain instructions for directing the user out of the building. In other embodiments, the user-worn device 130 may determine how to direct the user out of the building, as described in greater detail herein. If an evacuation is not necessary or possible, the building system 120 may optionally send the location at which the user can remain until the emergency has been mitigated, as shown in step 630. Step 630 may be optional because, as described herein, the user-worn device 130 may automatically determine the ideal location at which the user should be guided.

As shown in step 640, the building system 120 may receive tracking information. The tracking information may allow the building system 120 to accurately monitor the user's location within the building. The tracking information is not limited by this disclosure, and may generally be any transmission from any building component and/or the user-worn device 130. For example, the user-worn device 130 may transmit information containing GPS coordinates. In another example, the building system 120 may receive location information from a building RADAR or LiDAR system, a wi-fi tracking system, motion sensors, surveillance devices, and/or the like.

The tracking information may be used by the building system 120 to provide feedback to the user-worn device 130 in step 645 and/or notify an appropriate emergency service responder of the user's location in step 650. Providing feedback may allow the system to communicate with the user-worn device 130 in the event that the user makes a wrong turn in evacuating or reaching the location, new obstructions have confounded the user's intended route, and/or the like. Notifying the appropriate responder may allow the building system 120 to direct emergency service personnel to the appropriate location when the personnel arrive on scene, so as to quickly locate and provide emergency services to the user.

Figure 7:
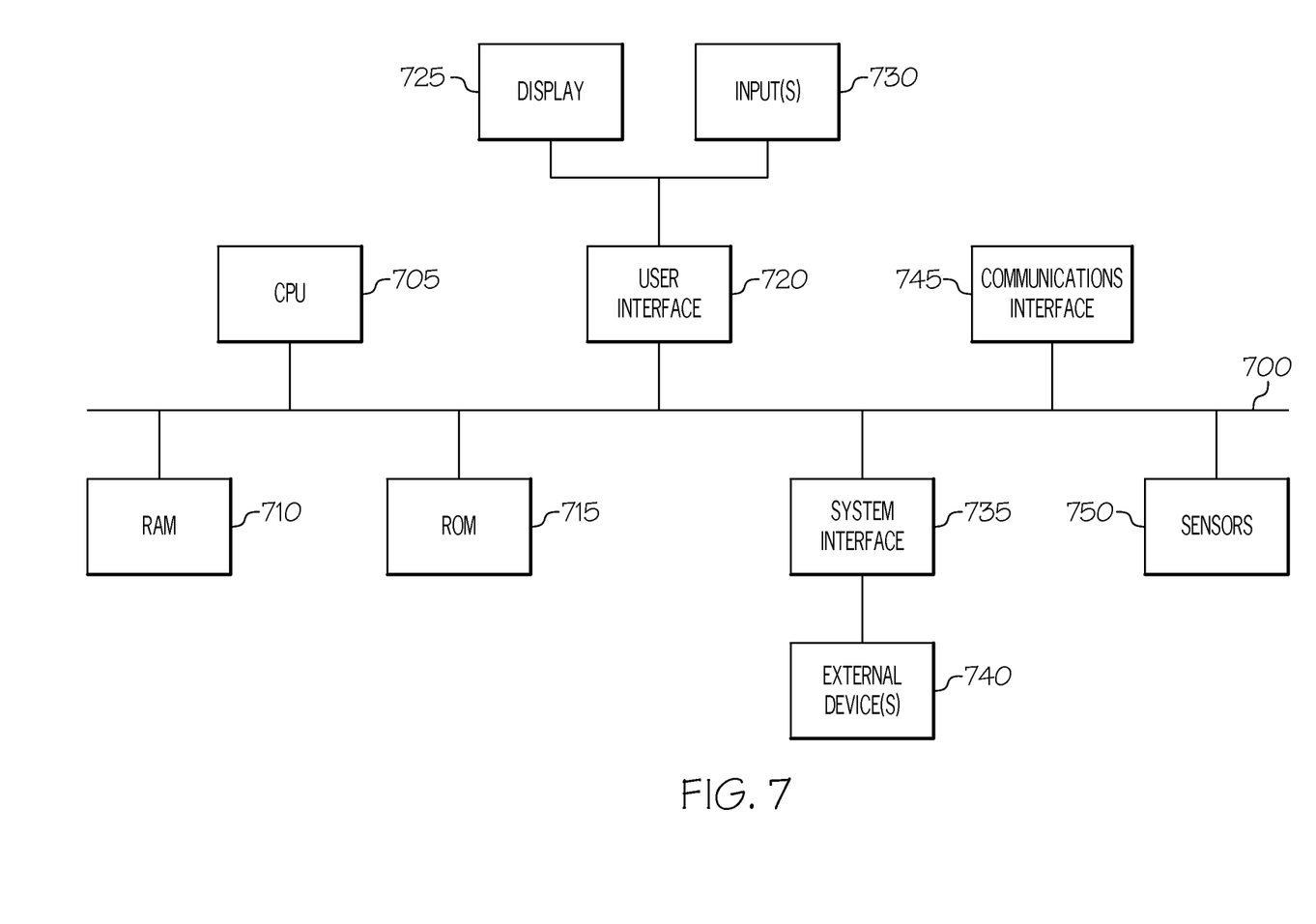
FIG. 7 depicts a block diagram of illustrative components of a computing device according to one or more embodiments shown and described herein.

In various embodiments, certain steps described herein may be completed by a computing device and/or a component thereof. The computing device may generally be a portion of the user-worn device 130 (FIG. 2), and/or any component thereof. Illustrative hardware components of the computing device are depicted in FIG. 7. A bus 700 may interconnect the various components. A processing device, such as a computer processing unit (CPU) 705, may be the central processing unit of the computing device, performing calculations and logic operations required to execute a program. The CPU 705, alone or in conjunction with one or more of the other elements disclosed in FIG. 7, is an illustrative processing device, computing device, processor, or combination thereof, as such terms are used within this disclosure. Memory, such as read only memory (ROM) 715 and random access memory (RAM) 710, may constitute illustrative memory devices (i.e., non-transitory processor-readable storage media). Such memory 710, 715 may include one or more programming instructions thereon that, when executed by the CPU 705, cause the CPU 705 to complete various processes, such as the processes described herein. Optionally, the program instructions may be stored on a tangible computer-readable medium such as a compact disc, a digital disk, flash memory, a memory card, a USB drive, an optical disc storage medium, such as a Blu-Ray™ disc, and/or other non-transitory processor-readable storage media.

An optional user interface 720 may permit information from the bus 700 to be displayed on a display 725 in audio, visual, graphic, or alphanumeric format. Moreover, the user interface 720 may also include one or more inputs 730 that allow for transmission to and receipt of data from input devices such as a keyboard, a mouse, a joystick, a touch screen, a remote control, a pointing device, a video input device, an audio input device, a haptic feedback device, and/or the like. Such a user interface 720 may be used, for example, to allow a user to interact with the user-worn device 130 (FIG. 2), interact with the building system 120 (FIG. 1), and/or the like.

A system interface 735 may generally provide the computing device with an ability to interface with one or more internal components 740, such as, for example, any of the components of the building system 120 (FIG. 1) and/or any of the components of the user-worn device 130 (FIG. 2). Communication with internal components may occur using various communication ports (not shown). An illustrative communication port may be attached to a communications network, such as the Internet, an intranet, a local network, a direct connection, and/or the like.

A communications interface 745 may generally provide the computing device with an ability to interface with one or more external components, such as, for example, an external computing device, a remote server, an emergency responder communications interface, and/or the like. Communication with external devices may occur using various communication ports (not shown). An illustrative communication port may be attached to a communications network, such as the Internet, an intranet, a local network, a direct connection, and/or the like. In some embodiments, the communications interface 745 may provide two-way communications between the user of the user-worn device 130 and an emergency responder.

One or more sensors 750 may generally provide the computing device with an ability to sense certain conditions in the environment surrounding the computing device. Illustrative sensors may include, but are not limited to, environmental sensors such as smoke sensors, carbon monoxide sensors, heat sensors, water sensors, and/or the like, biometric sensors such as heart rate sensors or the like, motion sensors, location-based sensors such as GPS, and/or the like.

Accordingly, the systems and methods described herein can be used to determine an emergency, including details related to the emergency, communicate with a user of a user-worn device to direct the user to a desired location or to evacuate a building, and provide communication capabilities between the user and an emergency services responder. In addition, the systems and methods described herein may be particularly useful for users that have a disability, as such systems can guide a disabled user to an ideal location in a way that conventional building alarm sensors cannot. For example, visually impaired users would not be able to see lighted exit signs and would benefit from audio and/or haptic turn-by-turn directions provided by the user-worn device.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A user-worn device that is worn by a user within a building comprising a building system, the user-worn device comprising:
    a sensor component comprising an environmental sensor for sensing an environment surrounding the user-worn device;
    a processing device; and
    a non-transitory, processor-readable storage medium, wherein the non-transitory, processor-readable storage medium comprises one or more programming instructions that, when executed, cause the processing device to:
        receive an input from the building system;
        determine that the input corresponds to an emergency;
        determine a response protocol for responding to the emergency based on information received from the building system and the sensor component, wherein the response protocol comprises directions to a location;
        provide the directions, via audio cues and haptic cues, to the user, wherein the directions guide the user to the location; and
        provide tracking information regarding the location of the user inside the building.

2. The user-worn device of claim 1, wherein the non-transitory, processor-readable storage medium further comprises one or more programming instructions that, when executed, cause the processing device to:
    send an acknowledgement to the building system, wherein the acknowledgement is a transmission that verifies receipt of the input and verifies that the user-worn device is functioning.

3. The user-worn device of claim 1, wherein the non-transitory, processor-readable storage medium further comprises one or more programming instructions that, when executed, cause the processing device to:
    determine that an evacuation of the building is not necessary; and
    provide directions that guide the user to the location, wherein the location is within the building.

4. The user-worn device of claim 1, wherein the non-transitory, processor-readable storage medium further comprises one or more programming instructions that, when executed, cause the processing device to:
    determine that an evacuation of the building is necessary; and
    provide directions that guide the user to the location, wherein the location is an exit of the building.

5. The user-worn device of claim 4, wherein the non-transitory, processor-readable storage medium further comprises one or more programming instructions that, when executed, cause the processing device to:
    determine a selected evacuation route from the plurality of evacuation routes,
    wherein the directions guide the user along the most appropriate evacuation route to the location.

6. The user-worn device of claim 1, further comprising a communications interface, and wherein the non-transitory, processor-readable storage medium further comprises one or more programming instructions that, when executed, cause the processing device to:
    provide, via the communications interface, a communications link between the user and an emergency responder.

7. The user-worn device of claim 1, wherein the non-transitory, processor-readable storage medium further comprises one or more programming instructions that, when executed, cause the processing device to provide the tracking information to an emergency responder.

8. The user-worn device of claim 1, further comprising a display, wherein the display provides information related to at least one of the emergency, the location, and the directions.

9. The user-worn device of claim 1, further comprising one or more input components.

10. The user-worn device of claim 1, wherein the sensor component further comprises a biometric sensor.

11. A method of assisting a user in an emergency with a user-worn device that is worn by a user within a building comprising a building system, the user-worn device comprising a processing device and a sensor component having an environmental sensor, the method comprising:
    receiving, by the processing device, an input from the building system;
    determining, by the processing device, that the input corresponds to an emergency;
    determining, by the processing device, a response protocol for responding to the emergency based on information received from the building system and the sensor component, wherein the response protocol comprises directions to a location;
    providing the directions, via audio cues and haptic cues, to the user, wherein the directions guide the user to the location; and
    providing tracking information regarding the location of the user inside the building.

12. The method of claim 11, further comprising:
    sending an acknowledgement to the building system, wherein the acknowledgement is a transmission that verifies receipt of the input and verifies that the user-worn device is functioning.

13. The method of claim 11, further comprising:
determining that an evacuation of the building is not necessary; and
providing directions that guide the user to the location, wherein the location is within the building.

14. The method of claim 11, further comprising:
determining that an evacuation of the building is necessary; and
providing directions that guide the user to the location, wherein the location is an exit of the building.

15. The method of claim 14, further comprising:
determining a selected evacuation route from the plurality of evacuation routes, wherein the directions guide the user along the selected evacuation route to the location.

16. The method of claim 11, further comprising:
providing, via a communications interface coupled to the processing device, a communications link between the user and an emergency responder.

17. The method of claim 11, wherein providing the tracking information further comprises providing, by the processing device, tracking information to an emergency responder.

18. An emergency service system comprising:
a building system within a building, wherein the building system monitors the building and detects emergencies; and
a user-worn device carried by a user located within the building, wherein the user-worn device interfaces with the building system to receive an input corresponding to an emergency, determines instructions for responding to the emergency based on the input from the building and information received from a sensor component of the user-worn device, provides the user with the instructions, via audio cues and haptic cues, for moving inside of the building during the emergency, and tracks a location of the user inside the building.

* * * * *